United States Patent
Faggioli et al.

(10) Patent No.: US 7,224,565 B2
(45) Date of Patent: May 29, 2007

(54) CONTROL CIRCUIT FOR DRIVING AN ELECTRIC ACTUATOR, IN PARTICULAR AN ELECTRIC FUEL INJECTOR FOR AN INTERNAL-COMBUSTION ENGINE

(75) Inventors: Eugenio Faggioli, Turin (IT); Renato Zenzon, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 0 days.

(21) Appl. No.: 10/956,071

(22) Filed: Oct. 4, 2004

(65) Prior Publication Data

US 2005/0111160 A1    May 26, 2005

(30) Foreign Application Priority Data

Oct. 3, 2003  (IT)  ............................. TO03A0778

(51) Int. Cl.
*H01H 47/00* (2006.01)
*H01F 13/00* (2006.01)

(52) U.S. Cl. .................. 361/139; 361/144; 361/145

(58) Field of Classification Search ................ 361/154, 361/139, 144, 145
See application file for complete search history.

(56) References Cited

U.S. PATENT DOCUMENTS

| | | | |
|---|---|---|---|
| 3,863,118 A | * | 1/1975 | Lander et al. ............... 318/685 |
| 4,266,261 A | | 5/1981 | Streit et al. |
| 4,402,299 A | * | 9/1983 | Nakao et al. ................ 123/632 |
| 4,429,268 A | * | 1/1984 | Yajima et al. .............. 318/696 |
| 4,600,868 A | * | 7/1986 | Bryant ........................ 318/567 |
| 5,134,537 A | | 7/1992 | Buss et al. |
| 5,615,064 A | * | 3/1997 | Blank et al. .................. 360/75 |
| 5,930,103 A | * | 7/1999 | Heck ........................... 361/187 |

FOREIGN PATENT DOCUMENTS

DE    37 22 527 A    1/1989

* cited by examiner

*Primary Examiner*—Brian Sircus
*Assistant Examiner*—Zeev Kitov
(74) *Attorney, Agent, or Firm*—Sughrue Mion, PLLC

(57) ABSTRACT

A control circuit that drives an electronic actuator. The control circuit includes a direct voltage source, a chopper circuit arranged between the source and an electric actuator, and an electronic control circuit designed to apply to the chopper circuit a command signal of the PWM type, with a predefined ON/OFF switching period and a predetermined duty cycle, for a predefined activation time, to produce a flow, within the electric actuator, of a correspondingly switched current having a nominal duration corresponding to the activation time. The control circuit detects the last whole or complete switching period included within the activation time, splits, in accordance with a predefined duty cycle, the final interval including the last complete switching period and any subsequent fraction of a switching period included within the activation time, and drives the chopper circuit in this final interval.

1 Claim, 3 Drawing Sheets

CONTROL CIRCUIT FOR DRIVING AN ELECTRIC ACTUATOR, IN PARTICULAR AN ELECTRIC FUEL INJECTOR FOR AN INTERNAL-COMBUSTION ENGINE

BACKGROUND OF THE INVENTION

The present invention relates to a circuit for driving an electric actuator, in particular an electric fuel injector for an internal-combustion engine.

Such a control circuit is schematically shown in FIG. 1 of the accompanying drawings.

In this figure, 1 denotes a direct voltage source, for example a battery in a motor vehicle. In the embodiment shown the voltage source 1 has its negative pole connected to earth GND and its positive pole connected to a chopper circuit denoted overall by 2. An electric actuator 3, such as an electric fuel injector of an internal-combustion engine, is connected to the chopper circuit 2.

4 denotes an electronic control unit designed to apply to the chopper circuit 2, for an activation time $t_i$ which is in each case predetermined and included between an initial instant $t_s$ and a final instant $t_e$, a command signal CS essentially of the PWM (Pulse-Width Modulation) type, with a predefined ON/OFF switching period p and a variable duty cycle. Correspondingly, the chopper circuit 2 causes the flow, within the electric actuator 3, of a correspondingly switched current I having a nominal duration corresponding to the abovementioned activation time $t_i$.

In control circuits for driving electric injectors, the current switching frequency is not particularly high so that the current has a ripple of notable amplitude.

If the duration of each fuel injection operation is controlled in an open loop, the time required for the injector to close completely depends on the instantaneous value reached by the current at the end of the electric injector activation time. In FIG. 2 of the accompanying drawings, the upper graph shows the qualitative progression of the current I in an electric injector driven with a circuit according to the prior art and the lower graph shows the progression of the command signal CS correspondingly applied to the chopper circuit associated with the electric injector. As can be seen, in the example of progression illustrated the current I has a rise phase of duration $t_r$, followed by a first switching phase of the peak value, of duration $t_p$, in turn followed by a subsequent switching phase in the region of a maintenance value, of duration $t_h$. The signal CS is high (ON) during the phase tr and then has a progression of the ON/OFF type during the phases $t_p$ and $t_h$, with a constant switching period p and with a high duty cycle during the phase $t_p$ and low duty cycle during the phase $t_h$.

The command signal CS, started at the initial instant $t_s$, terminates at the final instant $t_e$. At the instant $t_e$ in general the intensity of the current I may be between a minimum value $I_{HMIN}$ and a maximum value $I_{HMAX}$. Correspondingly, complete closing again of the electric injector occurs at a instant variable within a time interval E which represents the error in determination of the actual injection time.

SUMMARY OF THE INVENTION

One object of the present invention is to provide a control circuit for driving an electric actuator, in which the current in the electric actuator is controlled in an open loop, which circuit allows the abovementioned drawback of the solutions according to the prior art to be overcome.

This object and other objects are achieved according to the invention with a control circuit.

BRIEF DESCRIPTION OF THE DRAWINGS

Further characteristic features and advantages of the invention will become clear from the detailed description which follows, provided solely by way of a non-limiting example, with reference to the accompanying drawings, in which.

DETAILED DESCRIPTION OF THE INVENTION

Figure 1:
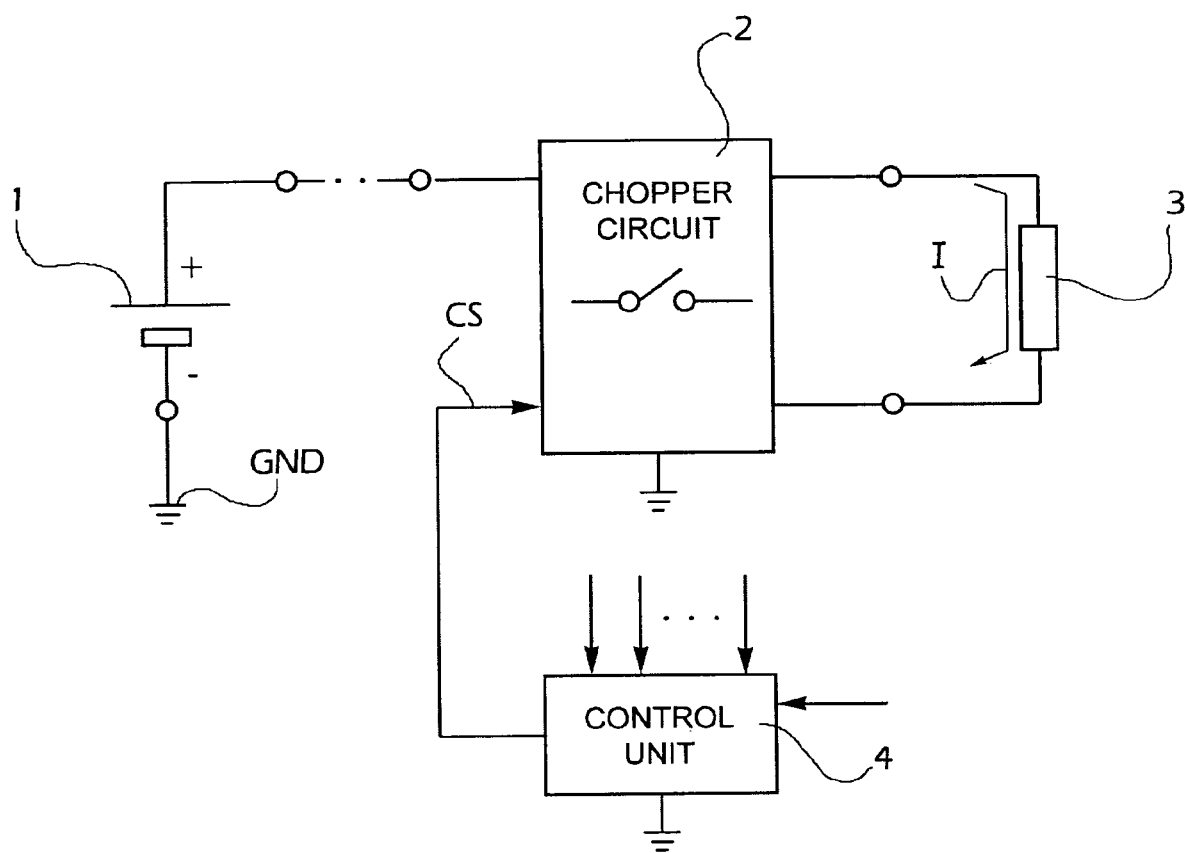
FIG. 1, already described, is a schematic illustration of a control circuit for driving an electric actuator.

The control circuit according to the invention has essentially the same architecture shown schematically in FIG. 1. However the control unit 4 drives the chopper circuit 2 in a different manner.

Figure 2:
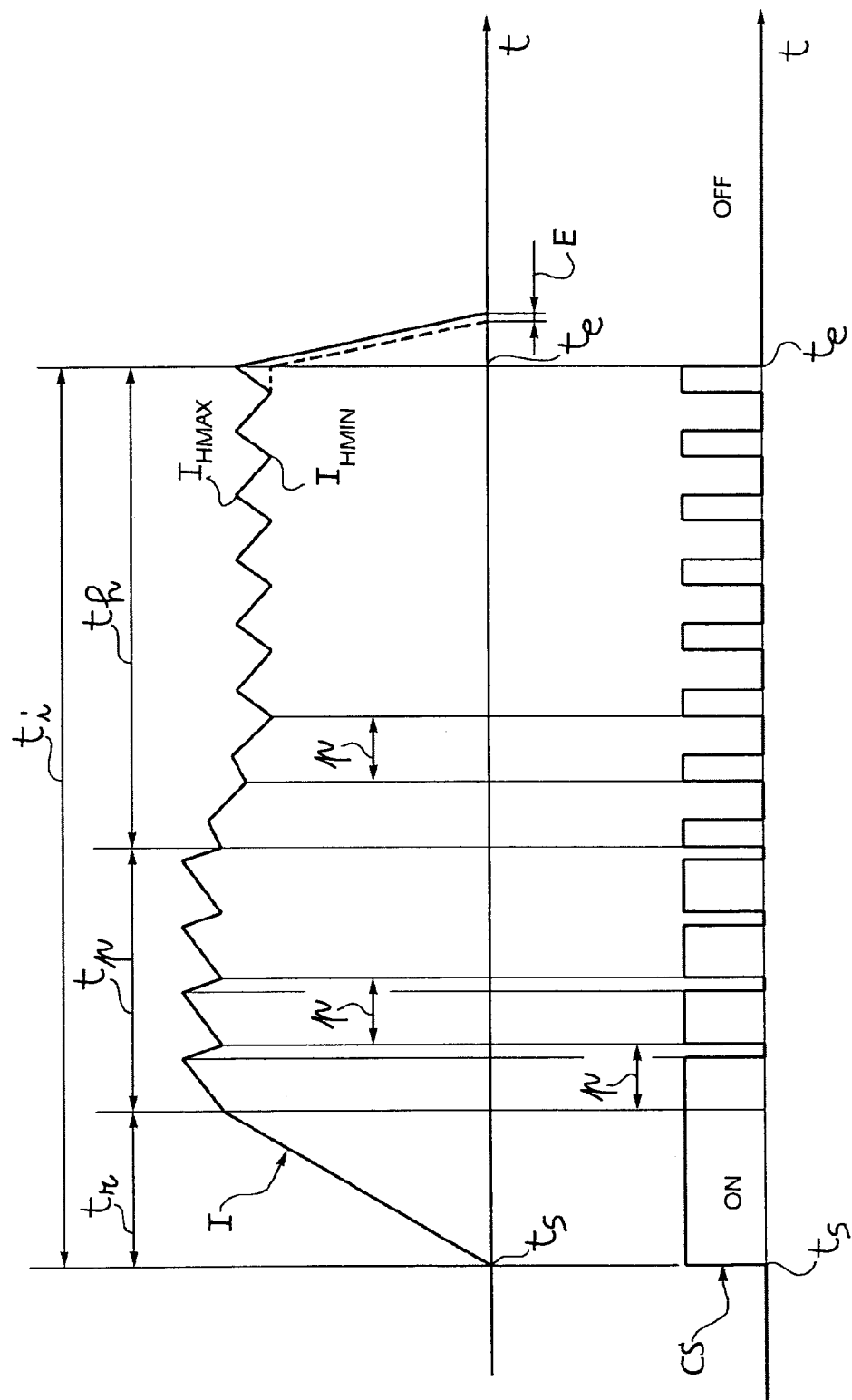
FIG. 2, which likewise has already been described, shows examples of progressions of a control signal and the current in an electric actuator in a circuit according to the prior art.

Very succinctly, in a control circuit according to the invention the control unit 4 is designed to determine the last whole or complete switching period included within the activation time $t_i$ of the electric actuator 3 before the final instant $t_e$. This last complete switching period is indicated by P in the upper graph according to FIG. 3. In this graph, which corresponds moreover to the upper graph in FIG. 2, in the final part of the activation time $t_i$ the broken lines indicate the progression of the current which would occur with a control circuit according to the prior art, while the continuous lines indicate the current progression which is achieved with a circuit according to the invention. A similar system of graphic representation is used in the lower graph of FIG. 3, which shows the progression of the command signal CS.

In general, determination of the last complete switching period P included within the activation time $t_i$ is fairly straightforward since the control unit 4 knows the initial instant $t_s$, the duration $t_r$ of the rise phase of the current I and the durations $t_p$ and $t_h$ of the subsequent current intensity switching phases. The duration p of the individual switching periods is also known. Therefore, whenever the electric actuator 3 must be activated (for opening in the case of an electric injector), the control unit 4 determines, on the basis of one or more external control parameters, the duration of activation $t_i$ and, since the values of the other abovementioned parameters are known, may easily determine the last complete switching period P included within the activation time $t_i$.

Figure 3:
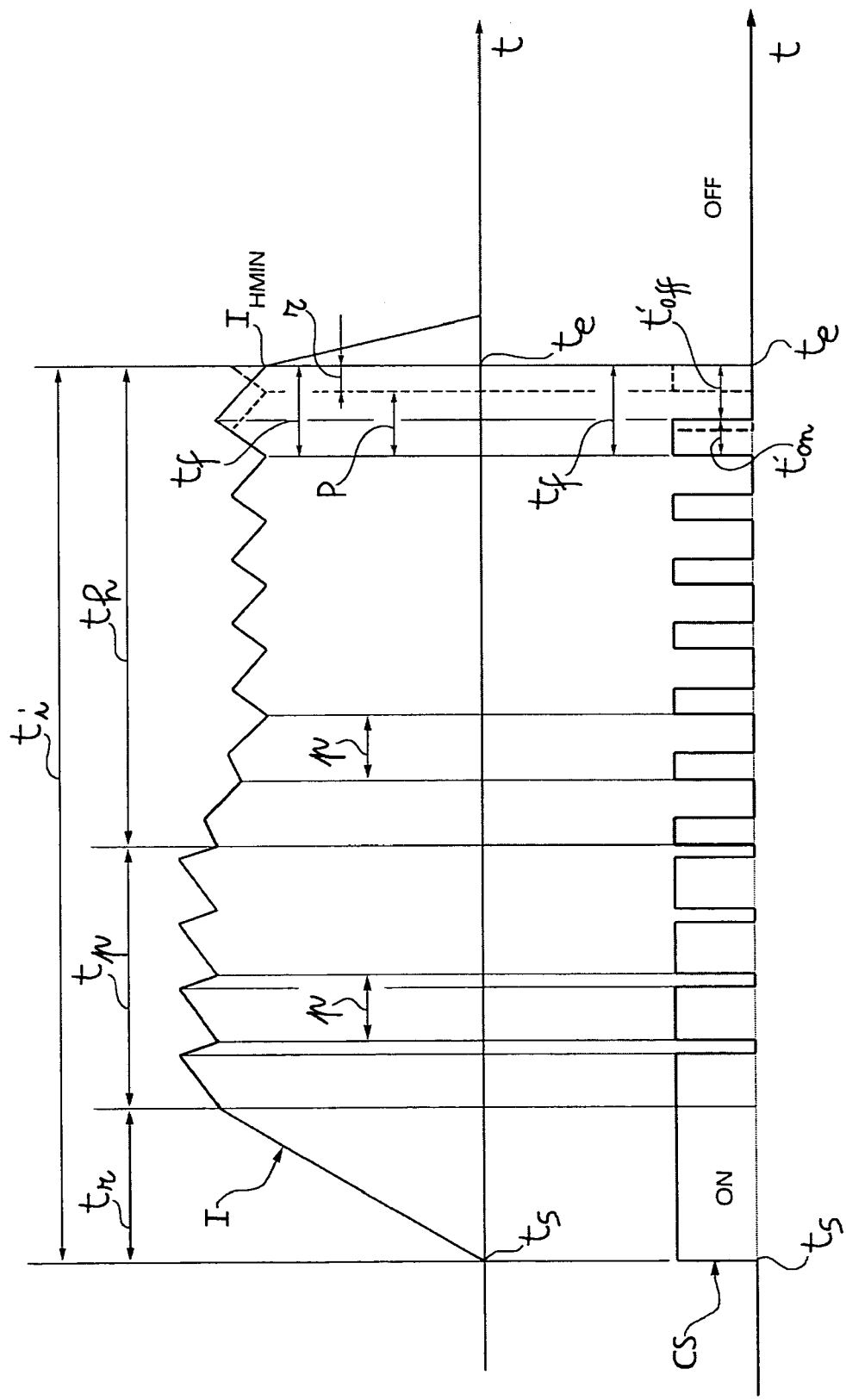
FIG. 3 is a set of two graphs similar to those shown in FIG. 2; these graphs show the progression of a command signal and the corresponding progression of the current in the electric valve in a circuit according to the present invention.

In order to eliminate or at least substantially reduce the error E, the control unit 4 of a control circuit according to the invention is also designed to split, in accordance with the duty cycle applied during the phase $t_h$, the final interval of the activation time $t_i$, indicated by $t_f$ in FIG. 3, which comprises the last complete period P and (any) subsequent fraction of a switching period indicated by r.

The control unit 4 therefore drives the chopper circuit 2 during the final interval $t_f$ in a manner corresponding to allocation of this final interval performed in accordance with the abovementioned duty cycle, and hence with a command signal which during the final interval $t_f$ is "ON" for the interval indicated by $t'_{on}$ in FIG. 3 and is "OFF" for the interval indicated by $t'_{off}$ in said figure.

As a result of this control method, at the end of the activation period $t_i$ the intensity I of the current flowing in the electric actuator 3 assumes essentially the minimum value $I_{HMIN}$ defined above. The instant of actual deactivation of the electric actuator (actual complete closure of the electric injector) is thus determined with a high degree of accuracy and is no longer affected by the error typical of the control systems according to the art indicated by E in FIG. 2.

The above is obviously applicable strictly speaking to conditions where the progression of the current I in the electric actuator may be reasonably represented by linear sections, i.e. by sections of straight lines. However, in less strict terms, but in conditions nevertheless suitable for evaluation from a quantitative point of view, the control system according to the invention is able to achieve a notable reduction in the error during the actual activation time (actual injection time) also with real, i.e. actual, progressions of the current I.

Obviously, without modifying the principle of the invention, the embodiments and the constructional details may be varied greatly with respect to that described and illustrated purely by way of a non-limiting example, without thereby departing from the scope of the invention, as defined in the accompanying claims.

What is claimed is:

1. Control circuit for driving an electric actuator, comprising:
    a direct voltage source;
    a chopper circuit arranged between said source and the electric actuator; and
    an electronic control circuit designed to apply to the chopper circuit a command signal essentially of the PWM type, with a predefined ON/OFF switching period and a predetermined duty cycle, for a predefined activation time, to produce a flow, within the electric actuator, of a switched current having a nominal duration corresponding to said activation time;
    wherein said control circuit
    detects the last complete switching period included within the activation time,
    identifies a final interval of the activation time, comprising the last complete switching period and any subsequent fraction of a switching period included within said activation time,
    splits said final interval into an on-time and an off-time in accordance with said predefined duty cycle, and
    drives the chopper circuit in said final interval to make the current in the actuator increase for said on-time and decrease for said off-time, to maintain substantially the same value of current in the actuator at the end of the activation time.

* * * * *